(12) United States Patent
Bhatt et al.

(10) Patent No.: US 8,855,689 B2
(45) Date of Patent: Oct. 7, 2014

(54) DIRECT SMS MESSAGE DELIVERY OVER BROADBAND DATA NETWORKS THROUGH AN SMS-C

(71) Applicant: Alcatel-Lucent USA Inc., Murray Hill, NJ (US)

(72) Inventors: Jay Bhatt, Naperville, IL (US); Yigang Cai, Naperville, IL (US); Gyan Shanker, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/791,476

(22) Filed: Mar. 8, 2013

(65) Prior Publication Data

US 2013/0190023 A1    Jul. 25, 2013

Related U.S. Application Data

(63) Continuation of application No. 12/536,947, filed on Aug. 6, 2009, now Pat. No. 8,412,240.

(51) Int. Cl.
*H04W 4/00* (2009.01)
*H04W 4/14* (2009.01)

(52) U.S. Cl.
CPC ..................... *H04W 4/14* (2013.01)
USPC ........... 455/466; 370/217; 370/218; 370/216; 370/352; 370/356

(58) Field of Classification Search
USPC ......... 370/216–220, 227, 228, 229, 235, 237, 370/352–356; 455/466, 423, 445, 435.1
See application file for complete search history.

(56) References Cited

U.S. PATENT DOCUMENTS

| | | | | |
|---|---|---|---|---|
| 5,732,078 A * | 3/1998 | Arango | ......................... | 370/355 |
| 6,363,065 B1 * | 3/2002 | Thornton et al. | ............. | 370/352 |
| 6,574,216 B1 * | 6/2003 | Farris et al. | .................... | 370/352 |
| 6,934,258 B1 * | 8/2005 | Smith et al. | .................. | 370/238 |
| 8,073,473 B2 * | 12/2011 | Huggett | ........................ | 455/466 |
| 8,478,886 B2 * | 7/2013 | Deshpande et al. | .......... | 709/228 |
| 2007/0263531 A1 * | 11/2007 | Huang | .......................... | 370/225 |
| 2007/0291648 A1 * | 12/2007 | Pfleging et al. | ............... | 370/237 |
| 2009/0082022 A1 * | 3/2009 | Gallagher et al. | ............. | 455/436 |
| 2010/0061244 A1 * | 3/2010 | Meier et al. | .................... | 370/236 |
| 2011/0255410 A1 * | 10/2011 | Yamen et al. | ................. | 370/237 |

\* cited by examiner

*Primary Examiner* — Ajit Patel

(74) *Attorney, Agent, or Firm* — Duft Bornsen & Fettig, LLP

(57) ABSTRACT

SMS-C's and associated methods are disclosed that attempt to deliver SMS messages over a broadband data network as opposed to a voice network. An SMS-C described herein stores session information for a mobile device that has established a data session over the broadband data network. When the SMS-C receives a Mobile Terminated (MT) SMS message destined for the mobile device, the SMS-C stores the SMS message for delivery. The SMS-C then identifies a routing address for the mobile device over the broadband data network based on the stored session information, and forwards the SMS message to the mobile device directly over the broadband data network based on the routing address.

18 Claims, 13 Drawing Sheets

DIRECT SMS MESSAGE DELIVERY OVER BROADBAND DATA NETWORKS THROUGH AN SMS-C

RELATED APPLICATIONS

The patent application is a continuation of a co-pending U.S. patent application having the Ser. No. 12/536,947, and filed on Aug. 6, 2009, which is incorporated by reference herein.

BACKGROUND

1. Field of the Invention

The invention is related to the field of communications and, in particular, to delivery of SMS messages.

2. Statement of the Problem

In many mobile networks, text messaging has become a very popular mode of communication. Short Message Service (SMS) is a communication protocol allowing the interchange of short text messages (e.g., 160 characters) between mobile devices. Often times, mobile users more frequently use SMS messaging for communication than voice calls.

SMS messages are presently transmitted over signaling channels of a voice network, such as over SS7 channels. A typical voice network includes a Radio Access Network (RAN) that provides an air interface to a mobile device, and a core network that connects the RAN to other networks, such as the PSTN or another RAN. The core network includes a switching system and a subscriber database for serving the mobile device. For instance, in a UMTS network, the switching system may comprise a Mobile Switching Center (MSC) and the subscriber database may comprise a Home Location Register (HLR). In an IP Multimedia Subsystem (IMS) network, the switching system may comprise a Call Session Control Function (CSCF) and the subscriber database may comprise a Home Subscriber Server (HSS). The core network also connects to a SMS Center (SMS-C). The SMS-C is the entity which performs the functions of storing and forwarding SMS messages to and from mobile devices.

The following illustrates an example of a delivery of a Mobile Terminated (MT) SMS message to a mobile device in a UMTS network. The SMS-C receives an SMS message destined for the mobile device, and stores the SMS message. The SMS-C then queries the subscriber database (i.e., HLR or HSS) for routing information based on the present position of the mobile device. The SMS-C then attempts to deliver the SMS message to the destination by routing the SMS message to the correct MSC through an SS7 channel. The MSC receives the SMS message from the SMS-C, and forwards the SMS message through the RAN to the mobile device using a signaling channel.

In an example of a delivery of a Mobile Originated (MO) SMS message, a sending party enters text into a mobile device, and also enters a phone number or address for the intended destination of the SMS message. When entry of the SMS message is completed, the mobile device sends the SMS message to the MSC over the RAN using a signaling channel. The MSC that is serving the mobile device receives the SMS message, and routes the SMS message to the SMS-C. The SMS-C stores the SMS message, and attempts to forward the SMS message to the destination.

A high volume of SMS traffic on a traditional voice network can cause problems. For example, each time an SMS message is received at the SMS-C, the SMS-C needs to query the subscriber database (i.e., HLR or HSS) to determine the routing information for the destination of the SMS message. When there is a high volume of SMS messages, a significant amount of messages are exchanged between the SMS-C and the subscriber database, which can reduce the overall operating speed of the voice network. Also, the signaling channels of the voice network can become congested with SMS traffic, as SMS messages are transported over the signaling channels. Even further, the switching systems, such as an MSC or CSCF, have to handle each SMS message, which can cause congestion at the switching systems. A service provider may implement more switching systems to handle higher SMS loads, but the expense of implementing the additional switching systems is undesirable.

SUMMARY

Exemplary embodiments described herein use an upgraded SMS-C to attempt to send SMS messages over a broadband data network instead of over signaling channels of the voice network. Some mobile devices are dual mode, meaning that they are able to communicate with a voice network, such as a CDMA network, and are also able to communicate with a broadband data network, such as an EVDO network. When an SMS message is originated at a dual mode mobile device, the mobile device attempts to route the message over the broadband data network instead of the voice network. When an SMS message is destined for a dual mode mobile device, the upgraded SMS-C attempts to route the message to the mobile device directly over the broadband data network instead of the voice network. Thus, SMS traffic is offloaded from the voice network to the broadband data network, which advantageously avoids congestion on the signaling channels of the voice network. Also, the SMS-C does not need to query the subscriber database (i.e., HLR or HSS) each time an SMS message is received, which further reduces message traffic in the voice network.

In one embodiment, a Short Message Service Center (SMS-C) is operable to forward SMS messages directly to a mobile device over a broadband data network, such as an EVDO network. The SMS-C includes a session database, an interface, and a control system. The session database is configured to store session information for a mobile device that has established a data session over the broadband data network. The interface is configured to receive a Mobile Terminated (MT) SMS message destined for the mobile device. The control system is configured to store the MT SMS message for delivery, to identify a routing address for the mobile device over the broadband data network based on the session information stored in the session database, and to forward the MT SMS message to the mobile device over the broadband data network based on the routing address.

In another embodiment, the interface of the SMS-C is configured to receive a Mobile Originated (MO) SMS message from the mobile device. The control system is configured to store the MO SMS message for delivery, and to verify that the MO SMS message is valid by comparing header information of the MO SMS message with the session information stored in the session database. The control system is further configured to identify a destination for the MO SMS message based on routing information, such as a routing table, if the MO SMS message is valid, and to forward the MO SMS message to the destination.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
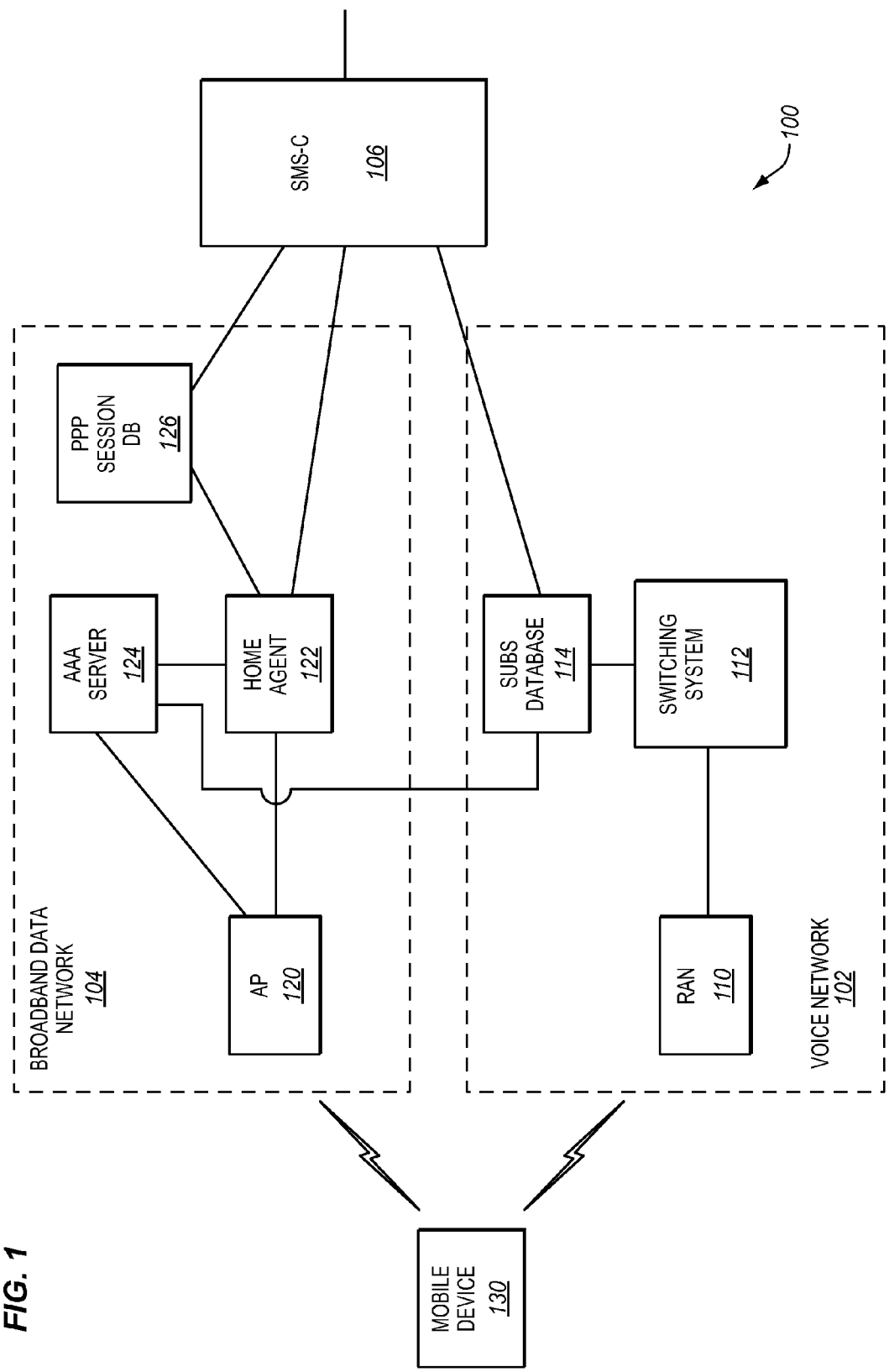
FIG. 1 illustrates a communication network in an exemplary embodiment.

FIG. 1 illustrates a communication network 100 in an exemplary embodiment. Communication network 100 includes a voice network 102, a broadband data network 104, and a Short Message Service Center (SMS-C) 106. Voice network 102 and broadband data network 104 are separate networks generally used for different purposes (one for voice, one for data respectively). However, both networks 102 and 104 may be managed or owned by a common service provider. Voice network 102 and broadband data network 104 are both operable to provide communication services to a dual mode mobile device 130. In the embodiments described below, mobile device 130 and SMS-C 106 will each attempt to send SMS messages over broadband data network 104 first, and then fail over to voice network 102.

Voice network 102 comprises any network that typically provides voice communications via wireless signals. Voice network 102 may include a circuit-based core network, a packet-based core network, and/or another type of core network. An example of voice network 102 includes a cellular network, such as a CDMA network or a GSM network. Although voice network 102 is typically used for voice communication, those skilled in the art understand that voice networks may also transport data communications in some instances.

In FIG. 1, voice network 102 includes a RAN 110, a switching system 112, and a subscriber database 114. RAN 110 comprises any radio or wireless network that interfaces a mobile device with a core network (represented by switching system 112 in FIG. 1). Examples of RAN 110 include a GSM RAN, a CDMA RAN, or a UMTS RAN. Switching system 112 comprises any switch, server, or other device in a core network that serves mobile devices. For instance, switching system 112 may comprise an MSC in a circuit-based network, or may comprise a Call Session Control Function (CSCF) in a packet-based IMS network. Subscriber database 114 comprises any database or similar system that stores and maintains subscriber information or subscriber data for one or more subscribers. For instance, subscriber database 114 may maintain subscriber data in the form of a subscriber record or subscriber profile for a user of mobile device 130. Subscriber database 114 may comprise a single centralized system or may be distributed among multiple systems.

Broadband data network 104 comprises any network that typically provides data communications via wireless signals. Broadband data network 104 may also be referred to as a "broadband data-only network" or a "broadband data-optimized network". Examples of broadband data network 104 include a Wireless Local Area Network (WLAN) using WiFi/WiMax communications, an Evolution-Data Optimized or Evolution-Data Only (EVDO) network, etc. An exemplary implementation of broadband data network 104 may be as an enterprise network in a corporation or campus, or as a "hot spot" in popular public places, such as an airport, coffee shop, etc. Although broadband data network 104 is typically used for data communication, those skilled in the art understand that broadband data networks may transport voice communications, such as VoIP calls.

In FIG. 1, broadband data network 104 includes an access point (AP) 120, one or more home agents 122, an Authentication, Authorization, and Accounting (AAA) server 124 (or any other network component that has mobile device registration session information), and a Point-to-Point Protocol (PPP) session database 126. Access point 120 (also referred to as a wireless access point (WAP)) comprises any device or component configured to exchange wireless signals with a mobile device for data communications. Home agent 122 comprises any system, server, or component configured to route packets to the proper access point 120 or from the access point 120 to another router or destination. AAA server 124 (or any other network component which has mobile device registration session information) comprises any system configured to manage access to broadband data network 104. PPP session database 126 comprises any server or database configured to store session information for sessions (e.g., PPP sessions) established over broadband data network 104.

SMS-C 106 comprises any system or server operable to handle SMS messages with a store-and-forward mechanism, such as according to SMS protocol. Although SMS-C 106 is shown in FIG. 1 as outside of voice network 102, those skilled in the art will appreciate that SMS-C 106 may be implemented in voice network 102 or another network not shown in FIG. 1. Although SMS messages and SMS protocol are referenced herein, other text message protocols may be used in other embodiments. Thus, SMS-C 106 may be referred to as a text message server, and SMS messages may be referred to as text messages. SMS-C 106 may connect to subscriber database 114 and PPP session database 126 using a Diameter interface, and may connect to home agent 122 using a SIP interface.

Mobile device 130 comprises any device operable to communicate via wireless signals, such as a mobile phone, a PDA, a PC, a mobile VoIP phone, etc. Mobile device 130 is a dual mode device in this embodiment, meaning that mobile device 130 is able to register and communicate with voice network 102 and broadband data network 104, which may utilize different wireless protocols.

In the embodiments described below, SMS-C 106 is upgraded so that it is able to forward SMS messages directly over broadband data network 104 to mobile device 130. Traditional SMS-C's are not data enabled, meaning that they are not able to forward messages directly over broadband data network 104. Traditional SMS-C's are only able to forward SMS messages over voice network 102 by querying the subscriber database 114 for routing information, and then forwarding the SMS message to the proper switching system 112 based on the routing information using signaling such as MAP. The upgraded SMS-C 106 in the following embodiments includes the functionality to forward SMS messages directly to mobile device 130 over broadband data network 104 without querying subscriber database 114 for routing information.

Figure 2:
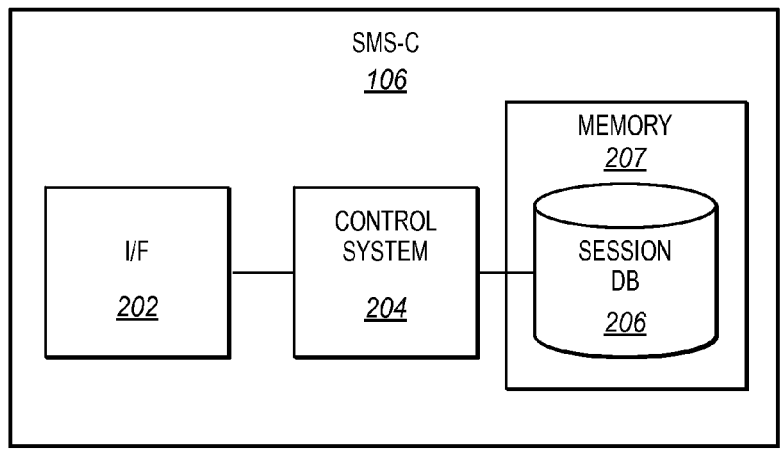
FIG. 2 illustrates a Short Message Service Center (SMS-C) in an exemplary embodiment.

FIG. 2 illustrates SMS-C 106 in an exemplary embodiment. In this embodiment, SMS-C 106 includes an interface 202, a control system 204, and a memory 207 including a session database (DB) 206. Interface 202 comprises any device, component, or system configured to transmit and receive signaling messages that include SMS messages. For example, interface 202 may be capable to transmit and receive SIP messages, SS7 messages, etc. Control system 204 comprises any device, component, or system configured to process signaling messages and/or SMS messages based on a store-and-forward mechanism, such as according to SMS protocol. Session database 206 comprises any storage system configured to store information regarding a session (e.g., a PPP session) within broadband data network 104 (see FIG. 1). For example, session database 206 may store a Mobile IP (MIP) address and a home agent (HA) address for subscribers having active PPP sessions in broadband data network 104.

According to the embodiments described below, SMS messages originated by mobile device 130 or destined for mobile device 130 will be routed over broadband data network 104. If the SMS message cannot be routed over broadband data network 104, then the SMS message may be routed over voice network 102 as a fail over.

Before SMS messages can be sent over broadband data network 104, mobile device 130 first registers with this network. To register, mobile device 130 transmits a register message, such as a SIP REGISTER, through AP 120 to AAA server 124. In response to the register message, AAA server 124 operates to authenticate mobile device 130, and set up a session for mobile device 130 over broadband data network 104. The session established for mobile device 130 is a data session, such as a Point-to-Point Protocol (PPP) session.

In addition to registering mobile device 130, AAA server 124 notifies subscriber database 114 or PPP session database 126 of the session that was set up for mobile device 130 in the event that an SMS message originates from or is sent to mobile device 130. Subscriber database 114 or PPP session database 126 thus receives a notification message from AAA server 124 that mobile device 130 has registered with broadband data network 104 and a session has been set up (see FIG. 1). One example of the notification message is a SIP NOTIFY. The notification message may include a variety of information regarding the session. For example, the notification message may include a mobile directory number (MDN) for mobile device 130, a Mobile IP (MIP) address for mobile device 130, a session status indicator (i.e., active or inactive), and a timestamp (session setup timestamp or session release timestamp). In response to the notification message, subscriber database 114 or PPP session database 126 updates a subscriber profile for the user of mobile device 130 based on the information provided in the notification message. As an example, subscriber database 114 may update a subscriber profile with the MIP address of mobile device 130 for the PPP session.

Figure 3:
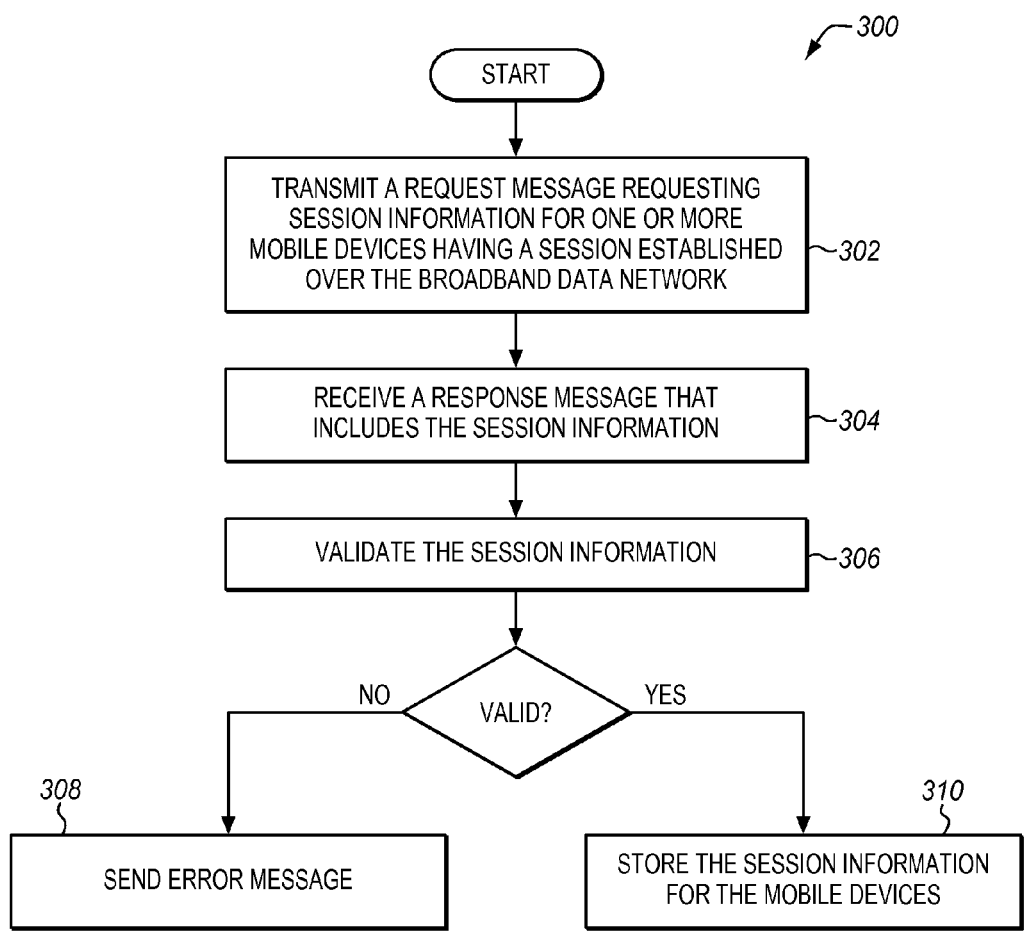
FIG. 3 is a flow chart illustrating a method of querying a database for session information by an SMS-C in an exemplary embodiment.

SMS-C 106 may then query subscriber database 114 or PPP session database 126 for the session information for mobile device 130 and other mobile devices. FIG. 3 is a flow chart illustrating a method 300 of querying a database for session information by SMS-C 106 in an exemplary embodiment. The steps of method 300 will be described with reference to exemplary communication network 100 in FIG. 1 and exemplary SMS-C in FIG. 2, but those skilled in the art will appreciate that method 300 may be performed in other networks and systems. Also, the steps of the flow charts provided herein are not all inclusive and other steps, not shown, may be included. Further, the steps may be performed in an alternative order.

In step 302, control system 204 transmits a request message through interface 202 to subscriber database 114 or PPP session database 126 requesting session information for one or more mobile devices that have established a session (PPP) over broadband data network 104, such as mobile device 130. For example, the request message may comprise a SIP SUBSCRIBE message requesting to be notified of any mobile devices that register with broadband data network 104. In another example, the request message may comprise a SIP OPTIONS message requesting to be notified of session information regarding mobile device 130 and/or other mobile devices.

In step 304, control system 204 receives a response message from subscriber database 114 or PPP session database 126 through interface 202 that includes the session information. For example, the response message may comprise a SIP NOTIFY message that includes session information for one or more mobile devices that have registered with broadband data network 104.

In step 306, control system 204 processes the response message to identify the session information included in the response message, and to validate the session information. For example, if some of the session information included in the response message is missing or incorrect, then control system 204 sends an error message back to subscriber database 114 or PPP session database 126 through interface 202 in step 308. Control system 204 may also determine whether a MIP address included in the response message is mapped to multiple MDNs, and if so sends an error message to subscriber database 114 or PPP session database 126. If the session information in the response message is complete and valid, then control system 204 stores the session information in session database 206 in step 310, or updates the session information for a mobile device if session information is already stored.

AAA server 124 may periodically send notification messages, such as SIP NOTIFY messages, to SMS-C 106 directly responsive to mobile device 130 registering with broadband data network 104.

While the session is active in broadband data network 104, AAA server 124 may periodically send notification messages to subscriber database 114 or PPP session database 126. In response to the periodic notification messages, subscriber database 114 or PPP session database 126 updates the stored session information, and sends out notification messages (i.e., SIP NOTIFY) to SMS-C 106. If mobile device 130 de-registers from broadband data network 104, then AAA server 124 also notifies subscriber database 114 or PPP session database 126 of this event through another notification message. Subscriber database 114 or PPP session database 126 may then notify SMS-C 106 of the de-registration.

Figure 4:
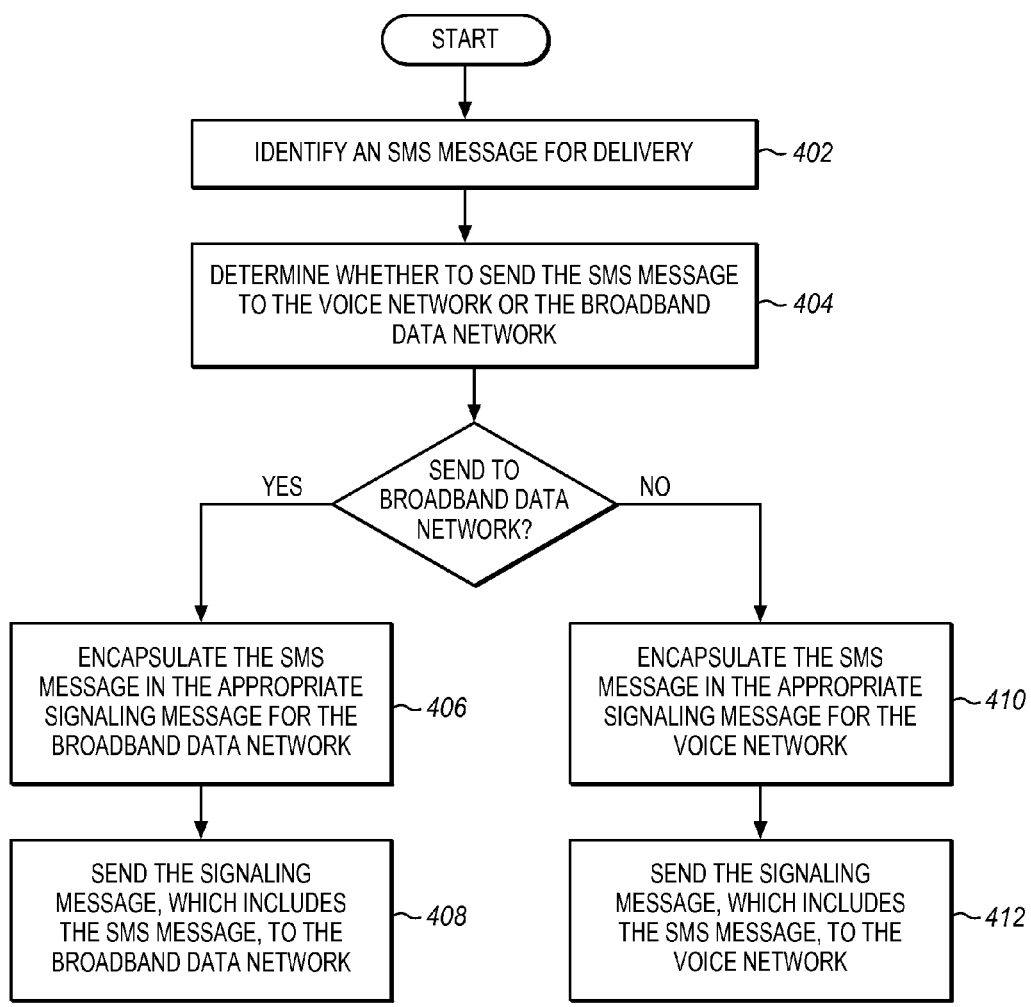
FIGS. 4-5 are flow charts illustrating a method of delivering a Mobile Originated (MO) SMS message in an exemplary embodiment.
Figure 5:
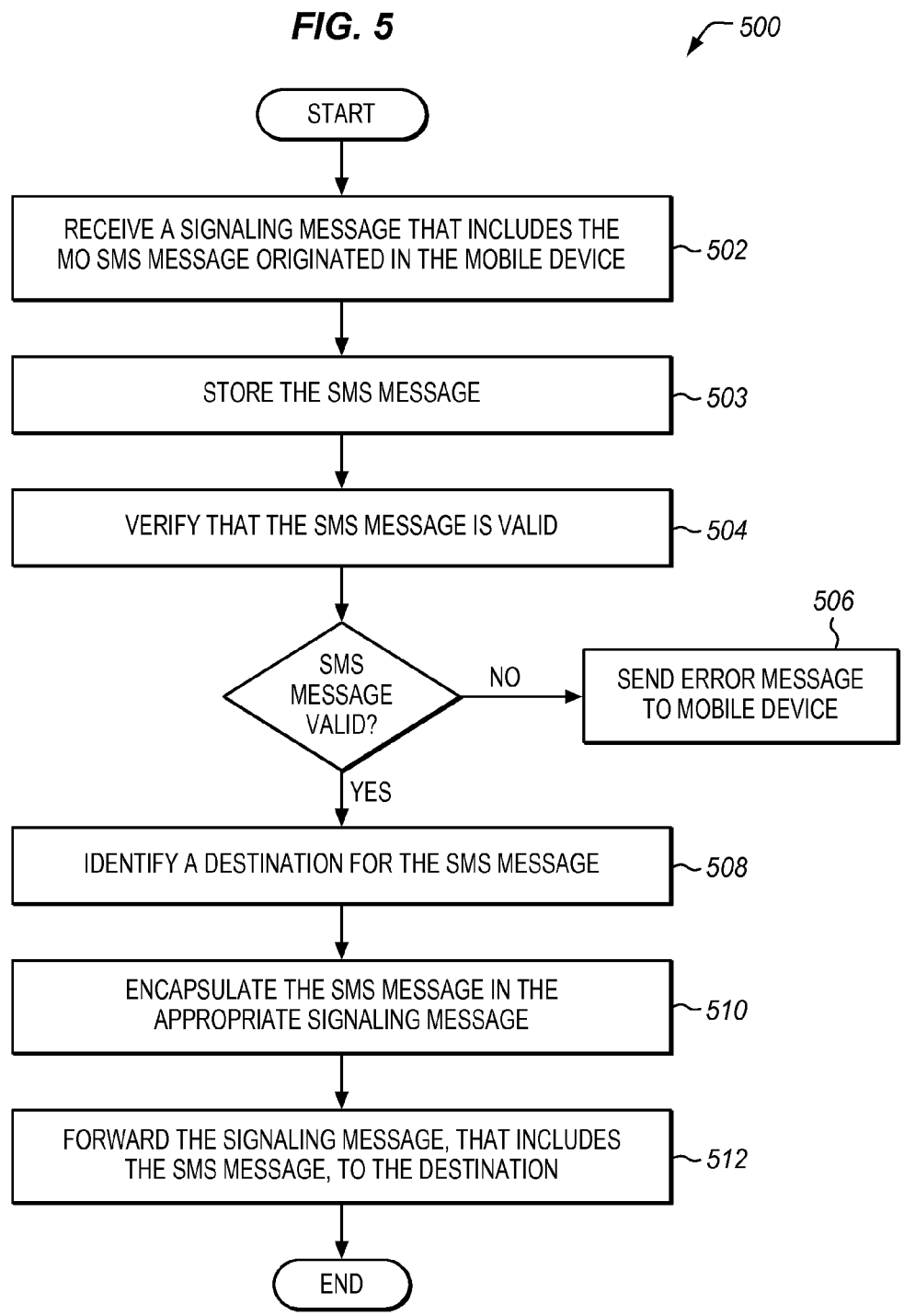

FIGS. 4-5 are flow charts illustrating a method 400 of delivering a Mobile Originated (MO) SMS message in an exemplary embodiment. The steps of method 400 will be described with reference to exemplary communication network 100 in FIG. 1 and exemplary SMS-C 106 in FIG. 2, but those skilled in the art will appreciate that method 400 may be performed in other networks and systems.

FIG. 4 illustrates the steps of method 400 performed in mobile device 130 for delivering the MO SMS message. In step 402, mobile device 130 identifies an SMS message for delivery (see also FIG. 1). The SMS message may be created by a user of mobile device 130, or may be an existing SMS message that is being re-sent or forwarded. In step 404, mobile device 130 determines whether to send the SMS message to voice network 102 or broadband data network 104. Because mobile device 130 has dual mode capabilities, mobile device 130 is able to send the SMS message to either voice network 102 or broadband data network 104. In making the determination of step 404, mobile device 130 may identify where it is presently registered. For example, if mobile device 130 is presently registered only in voice network 102, then mobile device 130 may make a determination to send the SMS message to voice network 102. If mobile device 130 is presently registered only in broadband data network 104, then mobile device 130 may make a determination to send the SMS message to broadband data network 104.

If mobile device 130 is registered in both networks 102 and 104, then mobile device 130 may process policies or criteria to make the determination of where to send the SMS message. The criteria may define that a default is to send the SMS message to broadband data network 104, and then fail over to voice network 102. The criteria may define that mobile device 130 sends the SMS message over broadband data network 104 during peak hours, and sends the SMS message over voice network 102 during non-peak hours.

If the determination in step 404 is to send the SMS message to broadband data network 104, then mobile device 130 encapsulates the SMS message in the appropriate signaling message for broadband data network 104 in step 406. For example, mobile device 130 may encapsulate the SMS message in a SIP MESSAGE or a SIP INVITE. Mobile device 130 then sends the signaling message, which includes the SMS message, to broadband data network 104 in step 408. The SMS message is received in home agent 122, which forwards the SMS message to SMS-C 106 (see FIG. 1). Mobile device 130 may be provisioned with the domain address of SMS-C 106 so that mobile device 130 may send the signaling message directly to SMS-C 106 (through home agent 122). Those skilled in the art will appreciate that steps 406 and 408 may be broadly described as sending the MO SMS message to broadband data network 104.

If the determination in step 404 is to send the SMS message to voice network 102, then mobile device 130 encapsulates the SMS message in the appropriate signaling message for voice network 102 in step 410. For example, mobile device 130 may encapsulate the SMS message in an SS7 message. Mobile device 130 then sends the signaling message, which includes the SMS message, to voice network in step 412.

Assume for the next embodiment that mobile device 130 sends the MO SMS message to broadband data network 104. FIG. 5 illustrates the steps of method 400 performed in SMS-C 106 for delivering the MO SMS message. In step 502, interface 202 of SMS-C 106 receives the signaling message that includes the SMS message. In step 503, control system 204 stores the SMS message for delivery using a store-and-forward mechanism defined by the SMS protocol. Control system 204 then processes the header of the SMS message to identify session information included in the header, such as a MIP address, an MDN, etc. In step 504, control system 204 verifies that the SMS message is valid. Control system 204 may verify that the SMS message is valid by comparing information in the header of the SMS message with session information stored in session database 206. For example, control system 204 may compare the MIP address of the SMS message with the MIP address of the mobile device 130 stored in the session database 206. Control system 204 may compare the MDN of the SMS message with the MDN of the mobile device 130 stored in the session database 206. Control system 204 may compare a session setup timestamp in the SMS message with the session setup timestamp for the session that is stored in session database 206. Control system 204 may also determine if data is missing or incorrect in the header of the SMS message.

If the SMS message is invalid, then control system 204 sends an error message to mobile device 130 in step 506 over broadband data network 104. If the SMS message is valid, then control system 204 identifies a destination for the SMS message according to routing information in step 508. The destination may be another SMS-C, an SMS application server, an External Short Messaging Entity (ESME), an inter-network carrier gateway (IC GW), etc. In one example, control system 204 may identify the destination based on a predefined routing table. In another example, routing information, such as a routing table, may be stored in memory 207. SMS-C 106 may be provisioned with an MDN routing table, and thus is able to identify the destination based on an MDN and the routing table. SMS-C 106 may thus forward the SMS message to the destination without having to query subscriber database 114 for routing information.

After identifying the destination, control system 204 encapsulates the SMS message in the appropriate signaling message in step 510. The type of signaling message used for the SMS message depends on the type of network the destination is implemented in. For example, if the destination is implemented in a GSM network, then control system 204 encapsulates the SMS message in an SS7 message. If the destination is implemented in an IMS network, then control system 204 encapsulates the SMS message in a SIP message. In step 512, control system 204 forwards the signaling message, which includes the SMS message, to the destination through interface 202. Those skilled in the art will appreciate that steps 510 and 512 may be broadly described as forwarding the SMS message to the destination.

Figure 6:
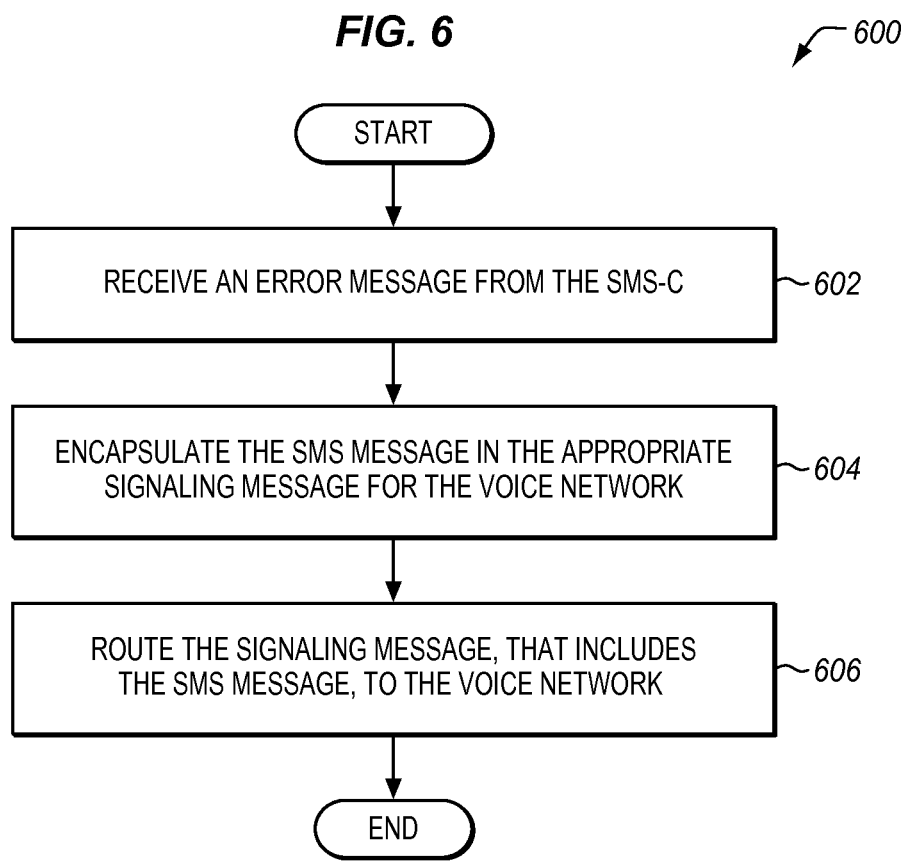
FIG. 6 is a flow chart illustrating a method of handling a failover within a mobile device in an exemplary embodiment.

In the event that the SMS message is not valid and control system 204 sends an error message to mobile device 130 in step 506, voice network 102 may be used as a fail over to deliver the SMS message. FIG. 6 is a flow chart illustrating a method 600 of handling a failover within mobile device 130 in an exemplary embodiment. In step 602, mobile device 130 receives the error message from SMS-C 106. The error message may be sent for a variety of reasons, one of which is that the SMS message was not valid. In step 604, mobile device 130 encapsulates the SMS message in the appropriate signaling message for voice network 102. For example, if voice network 102 comprises a GSM network, then mobile device 130 may encapsulate the SMS message in an SS7 message. Mobile device 130 then routes the signaling message, which includes the SMS message, to voice network 102 in step 606.

As an alternative, mobile device 130 may try to send the SMS message to broadband data network 104 again in response to the error message. If an error message is once again received from broadband data network 104, then mobile device 130 may retry the SMS message a threshold number of times. If delivery is still unsuccessful after the threshold number of attempts, then mobile device 130 may fail over to voice network 102, which is indicated in steps 604 and 606.

Figure 7:
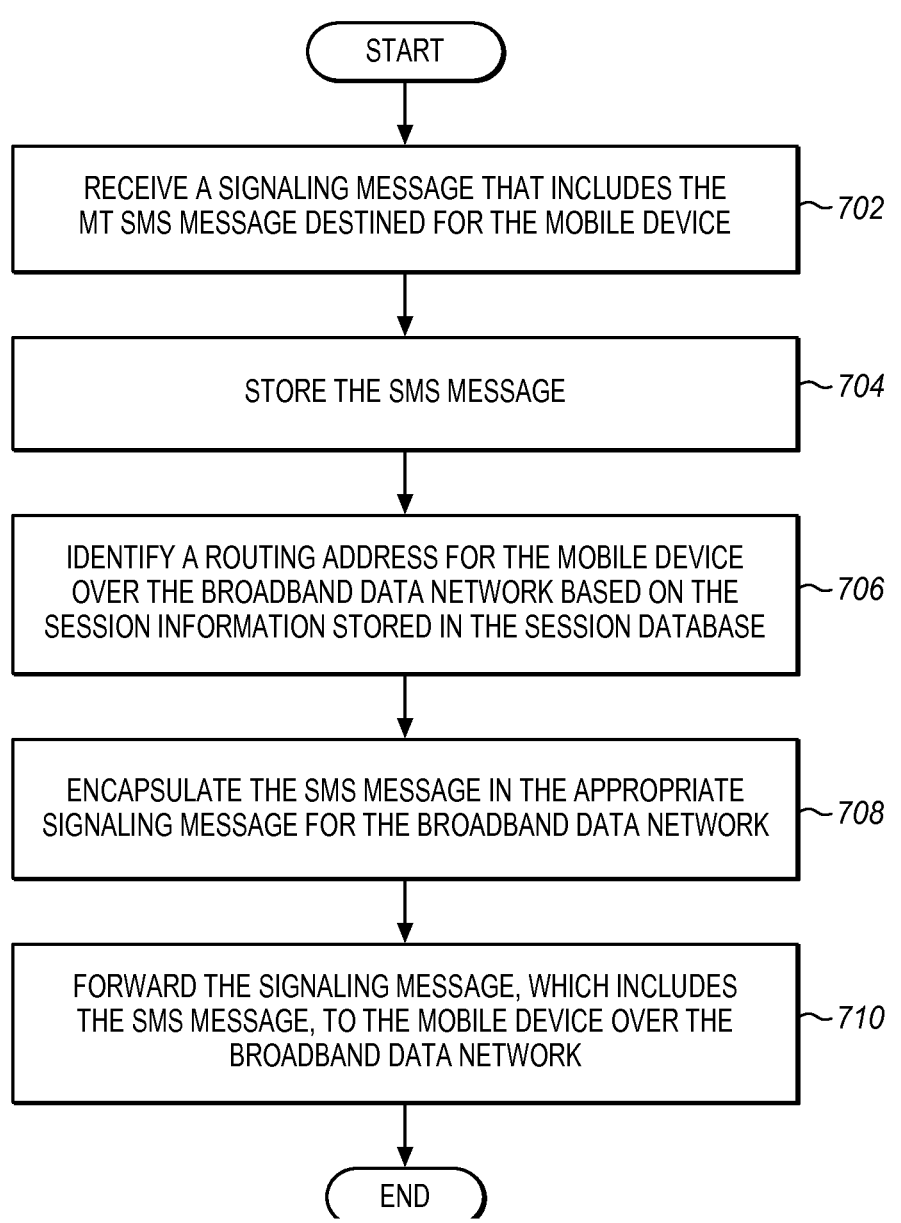
FIG. 7 is a flow chart illustrating a method of delivering a Mobile Terminated (MT) SMS message in an exemplary embodiment.

The following embodiment illustrates a Mobile Terminated (MT) SMS scenario. An MT SMS message, which is destined for mobile device 130, is handled by SMS-C 106. FIG. 7 is a flow chart illustrating a method 700 of delivering a Mobile Terminated (MT) SMS message in an exemplary embodiment. The steps of method 700 will be described with reference to exemplary communication network 100 in FIG. 1 and exemplary SMS-C 106 in FIG. 2, but those skilled in the art will appreciate that method 700 may be performed in other networks or systems. In step 702, interface 202 in SMS-C 106 receives a signaling message (or possibly a bearer traffic message) from an originator (not shown) that includes an SMS message destined for mobile device 130. Control system 204 stores the SMS message in step 704 for delivery using a store-and-forward mechanism defined by the SMS protocol. In step 706, control system 204 identifies a routing address for mobile device 130 over broadband data network 104 based on session information stored in session database 206 (assuming that the session is presently active). Because control system 204 is able to identify a routing address from internal information stored in session database 206, control system 204 does not have to query subscriber database 114 or PPP session database 126 for each SMS message that is received. Control system 204 may then route the SMS message directly to mobile device 130 over broadband data network 104 through interface 202.

To directly route the SMS message, control system 204 encapsulates the SMS message in the appropriate signaling message for broadband data network 104 in step 708, such as a SIP MESSAGE or a SIP INVITE. In step 710, control system 204 forwards the signaling message, which includes the SMS message, to mobile device 130 over broadband data network 104 through interface 202 (through home agent 122 and access point 120 in FIG. 1). It should be noted again that SMS-C 106 is able to forward the SMS message to broadband data network 104 without a specific query to subscriber database 114 or PPP session database 126 to obtain the routing address. Those skilled in the art will appreciate that steps 708 and 710 may be broadly described as forwarding the SMS message to mobile device 130 over broadband data network 104.

There may be instances where the SMS message cannot be delivered over broadband data network 104. Control system 204 may thus receive an error message from broadband data network 104 through interface 202. If an attempt to deliver the SMS message over broadband data network 104 fails, then voice network 102 may be used as a fail over to deliver the SMS message. Thus, SMS-C 106 forwards the SMS message to another SMS-C (not shown in FIG. 1) in the home network of the end user that is able to route the SMS message to mobile device 130 over voice network 102.

As described in the above embodiments, SMS traffic is advantageously offloaded from voice network 102 to broadband data network 104. The offload of SMS traffic from voice network 102 advantageously avoids congestion on the signaling channels of voice network 102. Also, SMS-C 106 does not need to query subscriber database 114 each time it receives an SMS message. This further reduces message traffic in voice network 102. With the reduced traffic, voice network 102 can maintain lower call setup times.

EXAMPLE

Figure 8:
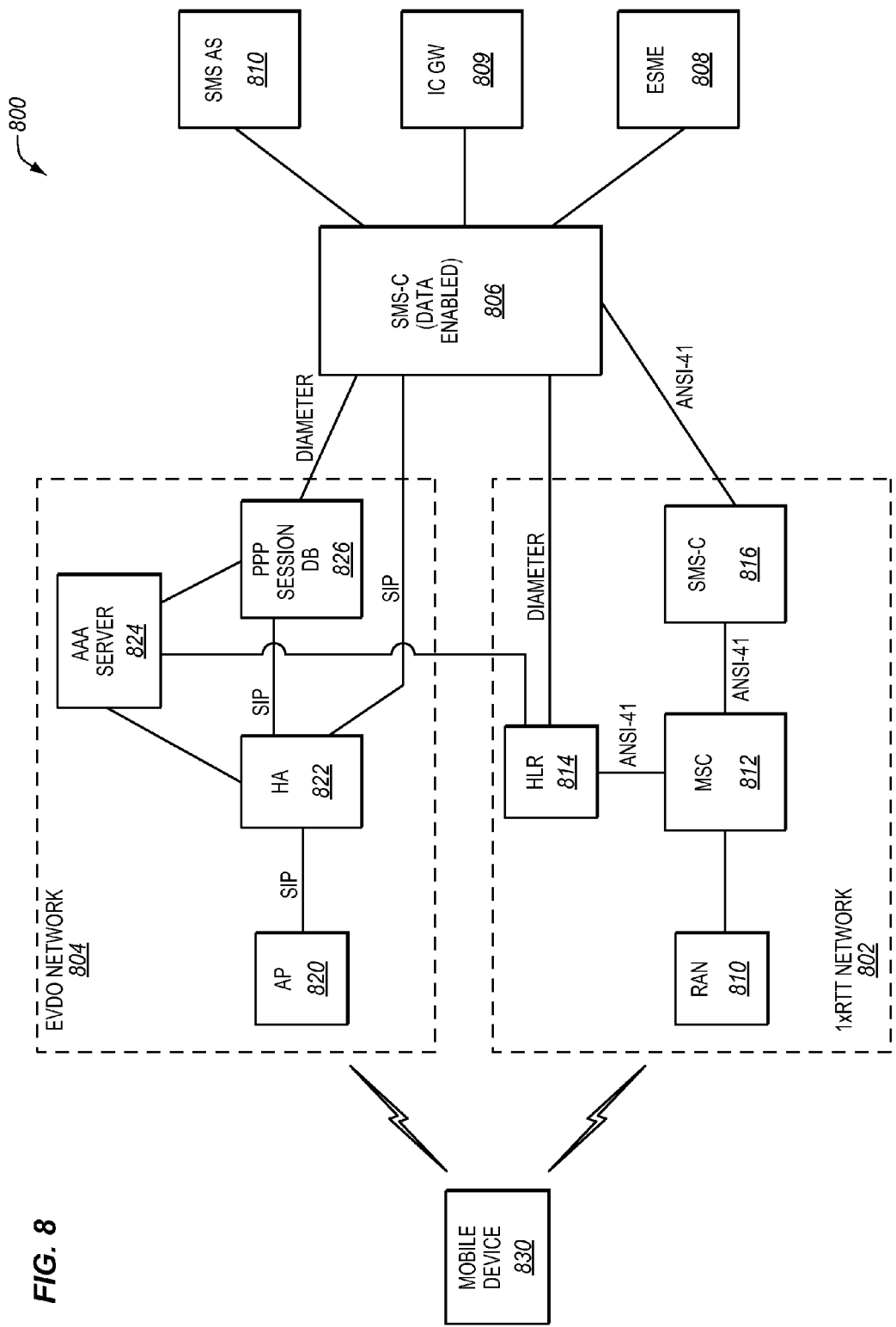
FIG. 8 illustrates another communication network in an exemplary embodiment.

FIG. 8 illustrates another communication network 800 in an exemplary embodiment. Communication network 800 includes a single carrier Radio Transmission Technology (1xRTT) network 802 and an EVDO network 804. 1xRTT network 802 and EVDO network 804 are both operable to provide communication services to a dual mode mobile device 830. The illustrated 1xRTT network 802 is a voice network that provides voice communications to mobile devices via wireless signals. 1xRTT network 802 includes a RAN 810, a Mobile Switching Center (MSC) 812, an HLR 814, and an SMS-C 816. EVDO network 804 comprises a broadband data network that provides data communications to mobile devices via wireless signals. The illustrated EVDO network 804 includes an access point (AP) 820, a home agent (HA) 822, a AAA server 824, and a PPP session database 826.

Mobile device 830 comprises any device operable to communicate via wireless signals, such as a mobile phone, a PDA, a mobile VoIP phone, etc. Mobile device 830 is a dual mode device in this embodiment, meaning that mobile device 830 is able to register and communicate with 1xRTT network 802 and EVDO network 804 that utilize different wireless protocols.

Communication network 800 also includes an SMS-C 806 that is upgraded to be data enabled, or in other words, EVDO enabled. SMS-C 806 is able to forward SMS messages directly over EVDO network 804. As a comparison, SMS-C 816 is not data enabled, and is only able to forward SMS messages over 1xRTT network 802. Communication network 800 also includes a variety of devices that route MT SMS messages to SMS-C 806, such as ESME 808, IC GW 809, and SMS application server (AS) 810.

Figure 9:
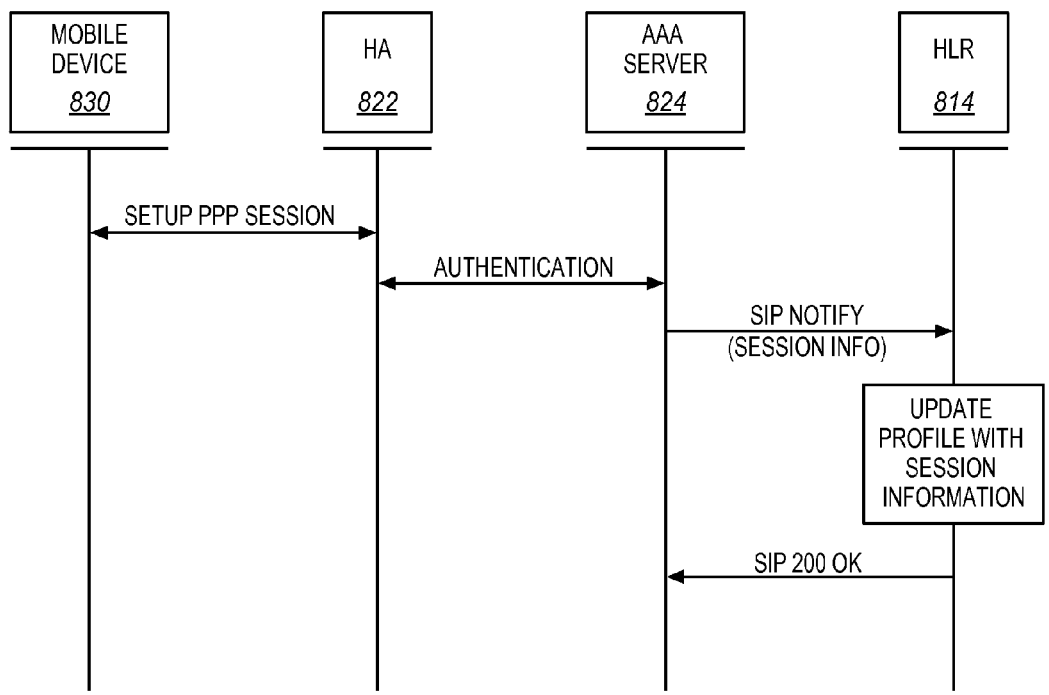
FIG. 9 is a message diagram illustrating a successful registration of a mobile device in an exemplary embodiment.

Before mobile device 830 is able to send or receive SMS messages over EVDO network 804, mobile device 830 first registers with EVDO network 804. FIG. 9 is a message diagram illustrating a successful registration of mobile device 830 in an exemplary embodiment. Mobile device 830 exchanges messages with home agent 822 to set up a PPP session in EVDO network 804. As part of setting up the PPP session, home agent 822 transmits an authentication request to AAA server 824. The authentication request may include, among other session information, an MDN, a home agent address, a MIP address, and a session setup timestamp. When the session is established, AAA server 824 is programmed to notify HLR 814 of the session information for mobile device 830. Thus, AAA server 824 generates a SIP NOTIFY and inserts the session information in the SIP NOTIFY. The session information may include a home agent address, a MIP address, and a session setup timestamp that are mapped to the MDN for mobile device 830. AAA server 824 then transmits the SIP NOTIFY to HLR 814.

HLR 814 processes the SIP NOTIFY to identify the inserted session information. If session information in the SIP NOTIFY is complete, then HLR 814 updates a subscriber profile for the user of mobile device 830. For example, HLR 814 may store the MDN and MIP address of mobile device 830 in the subscriber profile along with the home agent address. HLR 814 then responds to AAA server 824 with a SIP 200 OK.

While the PPP session is active, AAA server 824 may periodically send SIP NOTIFY's to HLR 814. In response to the periodic SIP NOTIFY's, HLR 814 updates the subscriber profile for the user of mobile device 830. A similar process is used to update the session information for other mobile devices. Also, a similar process may be used to store session information in PPP session database 826.

Figure 10:
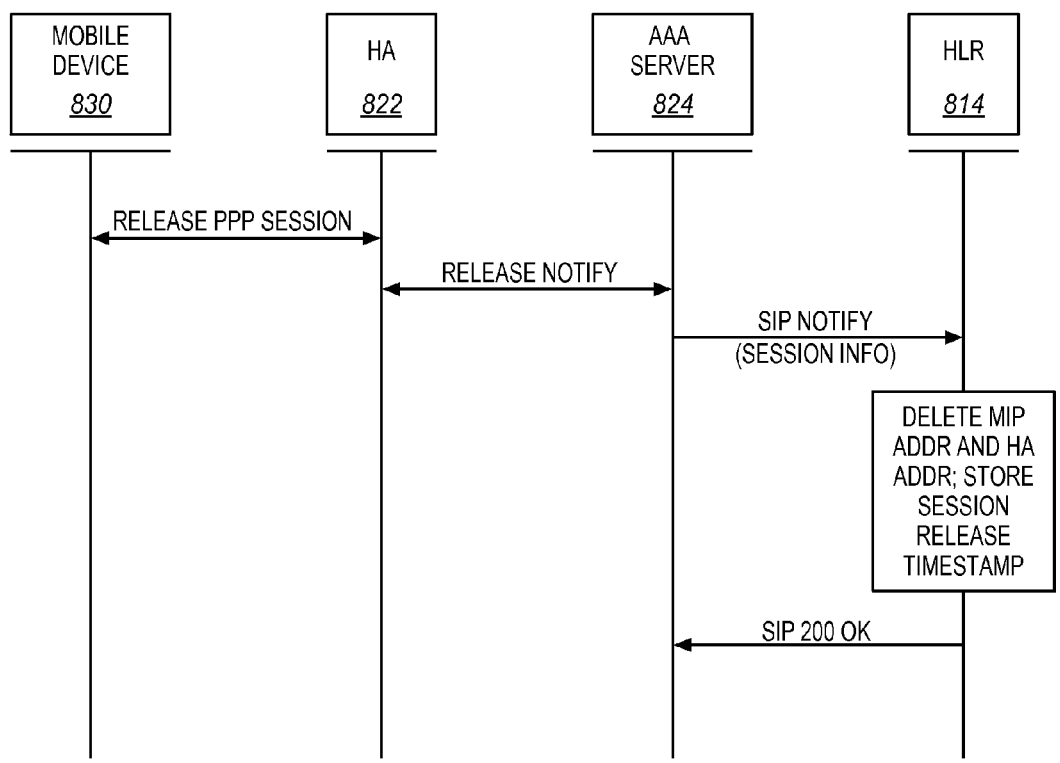
FIG. 10 is a message diagram illustrating a successful deregistration of a mobile device in an exemplary embodiment.

If the session involving mobile device 830 is torn down, then AAA server 824 also notifies HLR 814 of this event. The session involving mobile device 830 may be torn down for a variety of reasons, such as mobile device 830 being powered off, traveling out of the service area of EVDO network 804, etc. FIG. 10 is a message diagram illustrating a successful deregistration of mobile device 830 in an exemplary embodiment. Mobile device 830 exchanges messages with home agent 822 to release or tear down the PPP session in EVDO network 804. As part of releasing the PPP session, home agent 822 transmits a release notification message to AAA server 824. The release notification message request may include, among other session information, an MDN, a release indicator, and a session release timestamp. When the session is released, AAA server 824 is programmed to notify HLR 814 of the session information for mobile device 830. Thus, AAA server 824 generates a SIP NOTIFY and inserts the session information in the SIP NOTIFY. The session information may include an MDN, an HA address, a MIP address, and a session release timestamp. AAA server 824 then transmits the SIP NOTIFY to HLR 814 with the session information.

HLR 814 processes the SIP NOTIFY to identify the inserted session information. If session information in the SIP NOTIFY is complete, then HLR 814 deletes the MIP address and the home agent address that are mapped to the MDN for mobile device 830. HLR 814 may also store the session release timestamp and some indicator that the session is presently inactive. HLR 814 then responds to AAA server 824 with a SIP 200 OK.

Through the SIP NOTIFY'S provided by AAA server 824, HLR 814 (and PPP session database 826) are able to store updated session information on mobile device 830 and other mobile devices for sessions over EVDO network 804. Thus, SMS-C 806 may then query either HLR 814 or PPP session database 826 to acquire session information for those mobile devices 830 that have an on-going and active session over EVDO network 804. Using the session information, SMS-C 806 is able to forward SMS messages directly over EVDO network 804 to mobile device 830, which is described below.

Figure 11:
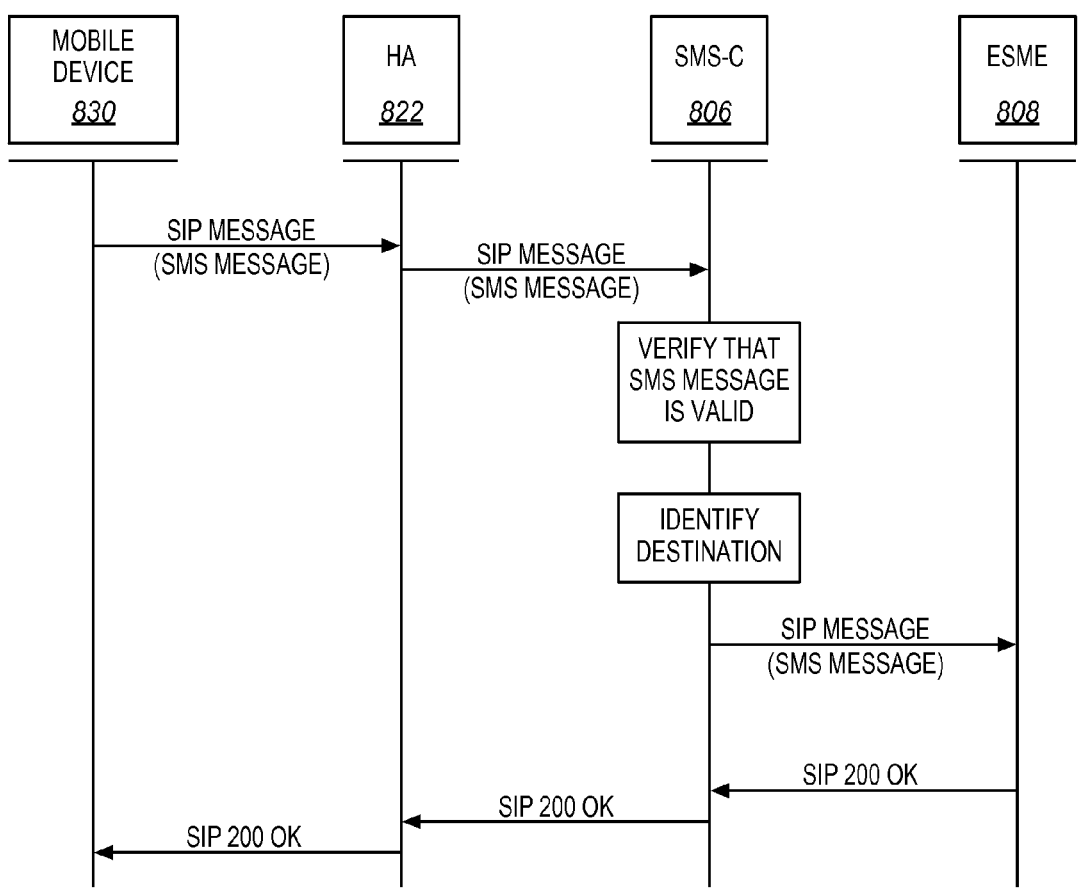
FIG. 11 is a message diagram illustrating a successful delivery of an MO SMS message over an EVDO network in an exemplary embodiment.

FIG. 11 is a message diagram illustrating a successful delivery of an MO SMS message over EVDO network 804 in an exemplary embodiment. To start, mobile device 830 identifies an MO SMS message, and encapsulates the SMS message in a SIP MESSAGE. Mobile device 830 then sends the SIP MESSAGE to home agent 822 through AP 820. In response to the SIP MESSAGE, home agent 822 identifies a routing address for SMS-C 806 that is data enabled. For example, home agent 822 may be pre-programmed with a routing address for SMS-C 806. Home agent 822 then routes the SIP MESSAGE, which includes the MO SMS message, to the identified SMS-C 806.

In response to receiving the SMS message, SMS-C 806 verifies that the SMS message is valid. SMS-C 806 may verify that the SMS message is valid by comparing information in the header of the SMS message with stored session information. For example, SMS-C 806 may compare the MIP address of the SMS message with a stored MIP address of mobile device 830. SMS-C 806 may compare the MDN of the SMS message with a stored MDN of mobile device 830. If the SMS message is valid, then SMS-C 806 identifies a destination for the SMS message, such as by processing a predefined routing table. SMS-C 806 is thus able to forward the SMS message to the destination without having to query HLR 814 for routing information. Assume that the destination for the SMS message is ESME 808. SMS-C 806 encapsulates the SMS message in a SIP MESSAGE, and forwards the SIP MESSAGE to ESME 808. ESME 808 responds back with a SIP 200 OK.

Figure 12:
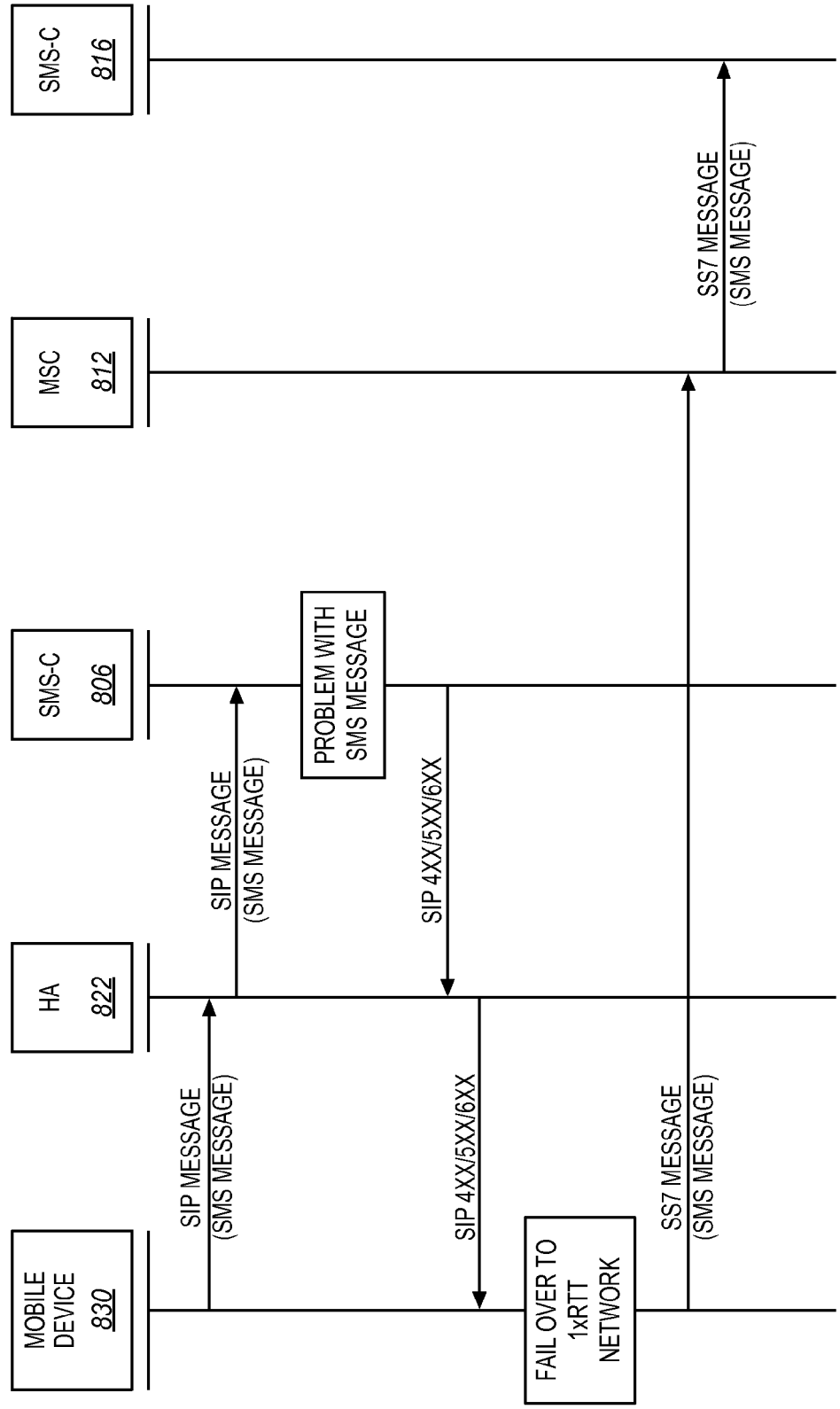
FIG. 12 is a message diagram illustrating an unsuccessful delivery of an MO SMS message over an EVDO network in an exemplary embodiment.

There may be instances where there is a problem delivering the SMS message over EVDO network 804. For example, some of the session information included in the SIP MESSAGE may be missing or incorrect. Or, the SMS message may time out. There may be multiple other scenarios where there is a problem delivering the SMS message. FIG. 12 is a message diagram illustrating an unsuccessful delivery of an MO SMS message over EVDO network 804 in an exemplary embodiment. As in FIG. 11, mobile device 830 identifies an MO SMS message, and encapsulates the SMS message in a SIP MESSAGE. Mobile device 830 then sends the SIP MESSAGE to home agent 822 through AP 820. Home agent 822 then forwards the SIP MESSAGE to SMS-C 806. SMS-C 806 or another network element identifies a problem for any of a variety of reasons. Thus, SMS-C 806 sends a SIP error message back to mobile device 830 depending on the problem. The SIP error message may comprise a SIP 400, a SIP 404, a SIP 504, or any other 4xx/5xx/6xx error message.

In response to the SIP error message, mobile device 830 is programmed to fail over to 1xRTT network 802. Thus, mobile device 830 encapsulates the MO SMS message in an SS7 message, which is the signaling protocol used in 1xRTT network 802. Mobile device 830 then routes the SS7 message, which includes the SMS message, to MSC 812 (through RAN 810). MSC 812 then routes the SS7 message to SMS-C 816. SMS-C 816 may then forward the MO SMS message to the destination according to SMS protocol.

The following example illustrates a Mobile Terminated (MT) SMS scenario in FIG. 8. Assume that an originator (not shown) sends an MT SMS message destined for mobile device 830. The MT SMS message is received by a network element, such as ESME 808, IC GW 809, or SMS application server 810. Each of these devices is programmed to route SMS messages to SMS-C 806 first. Assume that ESME 808 receives the SMS message destined for mobile device 830. ESME 808 then routes the SMS message to SMS-C 806.

Figure 13:
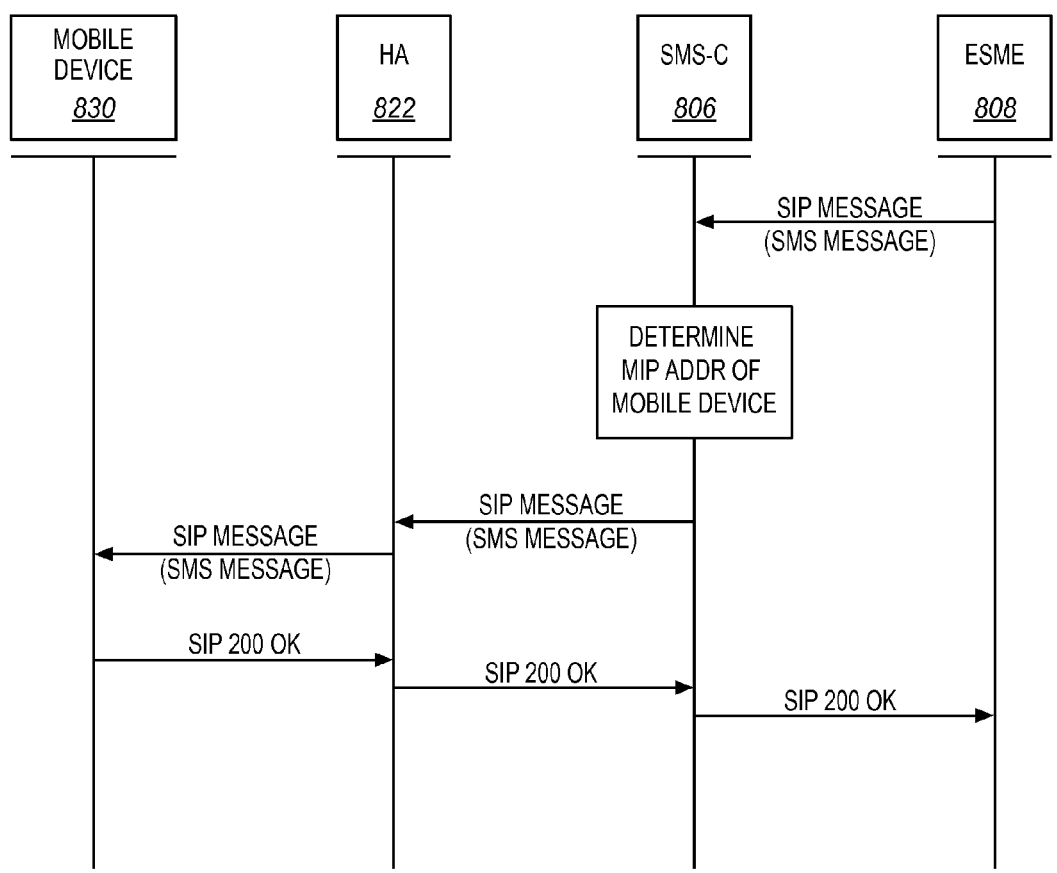
FIG. 13 is a message diagram illustrating a successful delivery of an MT SMS message over an EVDO network in an exemplary embodiment.

FIG. 13 is a message diagram illustrating a successful delivery of an MT SMS message over EVDO network 804 in an exemplary embodiment. The SMS message is received in SMS-C 806, which stores the SMS message. SMS-C 806 identifies a routing address for mobile device 830 over EVDO network 804. SMS-C 806 has previously queried HLR 814 or PPP session database 826 for session information for mobile device 830. Thus, SMS-C 806 has stored a home agent address and a MIP address for mobile device 830 which may be used to directly forward the SMS message to mobile device 830. SMS-C 806 then encapsulates the SMS message in a SIP MESSAGE, and forwards the SIP MESSAGE to home agent 822 and onto mobile device 830 based on the stored MIP address. Mobile device 830 responds to SMS-C 806 with a SIP 200 OK, which indicates that the MT SMS message was successfully delivered.

Figure 14:
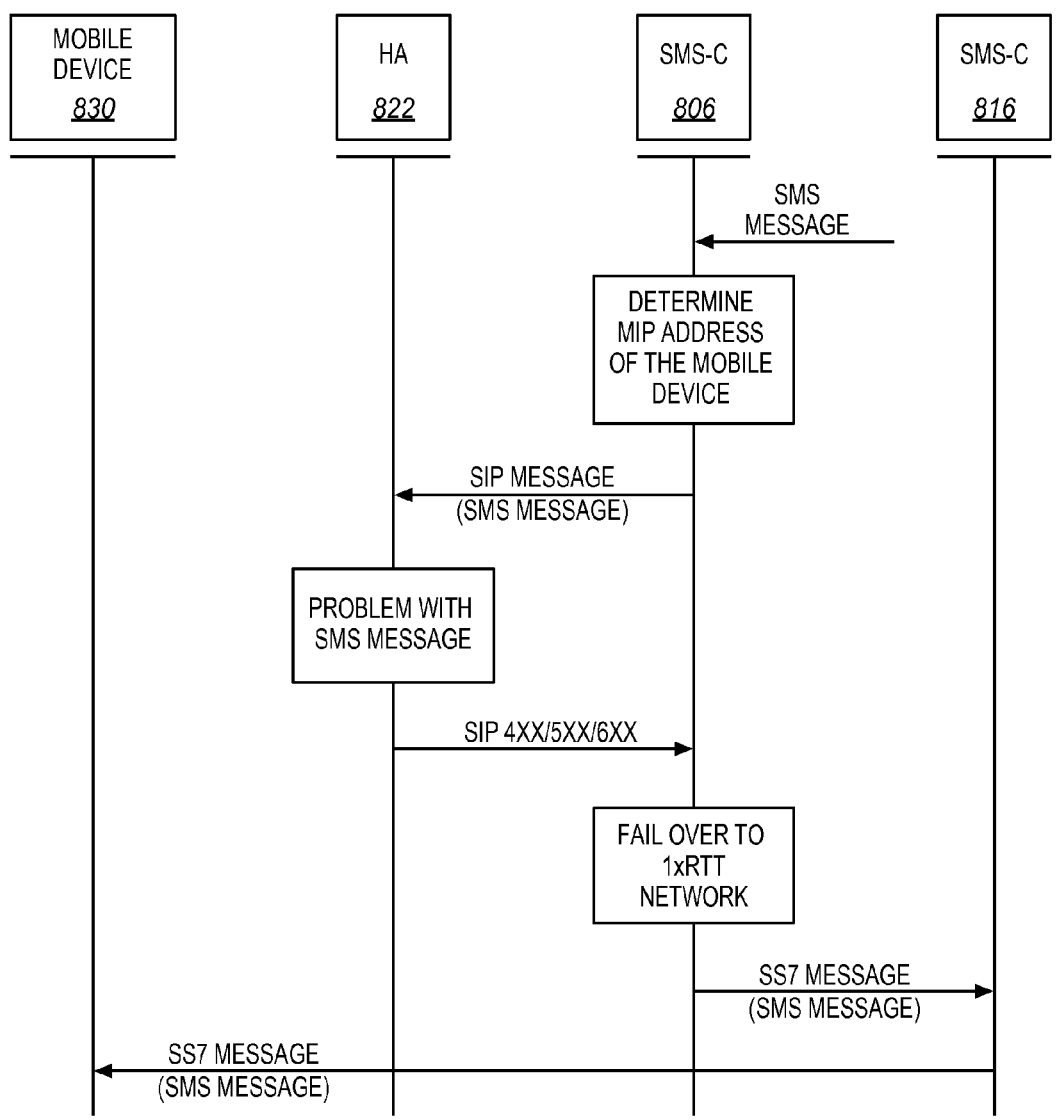
FIG. 14 is a message diagram illustrating an unsuccessful delivery of an MT SMS message over an EVDO network in an exemplary embodiment.

There may be instances where there is a problem delivering the SMS message over EVDO network 804. For example, some of the session information included in the SIP MESSAGE may be missing or incorrect. Or, the MIP address cannot be identified for the SMS message. Or, the SMS message may time out. There may be multiple other scenarios where there is a problem delivering the SMS message. FIG. 14 is a message diagram illustrating an unsuccessful delivery of an MT SMS message over EVDO network 804 in an exemplary embodiment. As in FIG. 13, SMS-C 806 receives the MT SMS message, and stores the SMS message. SMS-C 806 then identifies the routing address for mobile device 830. SMS-C 806 then encapsulates the SMS message in a SIP MESSAGE, and forwards the SIP MESSAGE to home agent 822 based on the stored MIP address. Home agent 822 or another network element identifies a problem for any of a variety of reasons. Thus, home agent 822 sends a SIP error message back to SMS-C 806 depending on the problem. The SIP error message may comprise a SIP 400, a SIP 404, a SIP 504, or any other 4xx/5xx/6xx error message.

In response to the SIP error message, SMS-C 806 is programmed to fail over to 1xRTT network 802. Thus, SMS-C 806 encapsulates the MT SMS message in an SS7 message, which is the signaling protocol used in 1xRTT network 802. SMS-C 806 then forwards the SS7 message, which includes the SMS message, to SMS-C 816 which stores the SMS message. SMS-C 816 is able to send the SMS message to mobile device 830 over 1xRTT network 802. Thus, SMS-C 816 encapsulates the MT SMS message in an SS7 message, which is the signaling protocol used in 1xRTT network 802, and forwards the SS7 message to mobile device 830.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:

a text message server configured to handle text messages using a store-and-forward mechanism, the text message server including a processor and a memory unit associated with the processor;

the processor configured to receive a text message destined for a dual mode device, to determine that the dual mode device is registered with a data network, and to forward the text message as Mobile Terminated (MT) to the dual mode device over the data network instead of over a voice network;

the processor is further configured to identify a failed delivery attempt of the MT text message over the data network, and to forward the MT text message to the dual mode device over the voice network responsive to the failed delivery attempt.

2. The apparatus of claim 1 wherein:

the processor is further configured to store information for a session established by the dual mode device over the data network prior to receiving the text message.

3. The apparatus of claim 2 wherein:

the session information for the dual mode device includes a Mobile Internet Protocol (MIP) address for the dual mode device.

4. The apparatus of claim 2 wherein:

the processor is further configured to query a subscriber database in the voice network to acquire the session information for the dual mode device.

5. The apparatus of claim 2 wherein:

the processor is further configured to query a session database in the data network to acquire the session information for the dual mode device.

6. The apparatus of claim 2 wherein:

the processor is further configured to receive a Mobile Originated (MO) text message from the dual mode device, to verify that the MO text message is valid by comparing header information of the MO text message with the session information for the dual mode device, and to forward the MO text message to a destination when the MO text message is valid.

7. The apparatus of claim 6 wherein:

the processor is further configured to send an error message to the dual mode device when the MO text message is invalid to instruct the dual mode device to attempt to send the MO text message over a voice network as a fail over.

8. The apparatus of claim 6 wherein:

the processor is further configured to validate the MO text message by comparing a Mobile Internet Protocol (MIP) address in a header of the MO text message with a MIP address of the dual mode device.

9. The apparatus of claim 1 wherein:

the data network comprises an Evolution-Data Optimized (EVDO) network.

10. A method comprising:

receiving, in a text message server configured to handle text messages using a store-and-forward mechanism, a text message destined for a dual mode device;

determining that the dual mode device is registered with a data network;

forwarding the text message as a Mobile Terminated (MT) to the dual mode device over the data network instead of over a voice network;

identifying a failed delivery attempt of the MT text message over the data network; and forwarding the MT text message to the dual mode device over the voice network responsive to the failed delivery attempt.

11. The method of claim 10 further comprising:

storing, in the text message server, information for a session established by the dual mode device over the data network prior to receiving the text message.

12. The method of claim 11 wherein:

the session information for the dual mode device comprises a Mobile Internet Protocol (MIP) address for the dual mode device.

13. The method of claim 11 further comprising:

querying a subscriber database in the voice network to acquire the session information for the dual mode device.

14. The method of claim 11 further comprising:

querying a session database in the data network to acquire the session information for the dual mode device.

15. The method of claim 11 further comprising:

receiving a Mobile Originated (MO) text message from the dual mode device;

verifying that the MO text message is valid by comparing header information of the MO text message with the session information for the dual mode device; and forwarding the MO text message to a destination when the MO text message is valid.

16. The method of claim 15 further comprising:

sending an error message to the dual mode device when the MO text message is invalid to instruct the dual mode device to attempt to send the MO text message over a voice network as a fail over.

17. The method of claim 15 further comprising:

validating the MO text message by comparing a Mobile Internet Protocol (MIP) address in a header of the MO text message with a MIP address of the dual mode device.

18. The method of claim 10 wherein:

the data network comprises an Evolution-Data Optimized (EVDO) network.

\* \* \* \* \*